W. P. DALRYMPLE.
PHONOGRAPH.
APPLICATION FILED SEPT. 15, 1917.
1,358,709.
Patented Nov. 16, 1920.
6 SHEETS—SHEET 1.
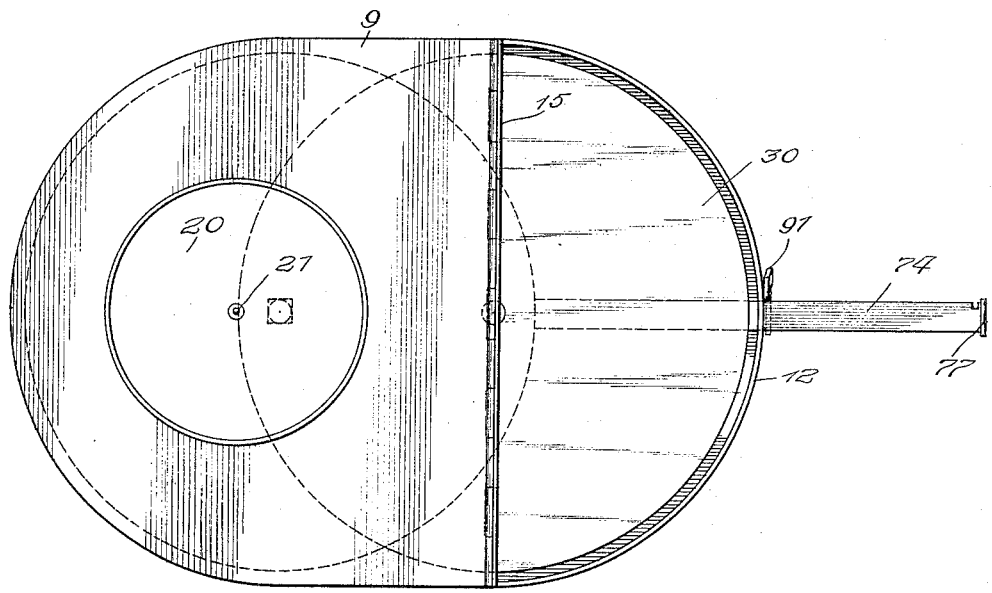
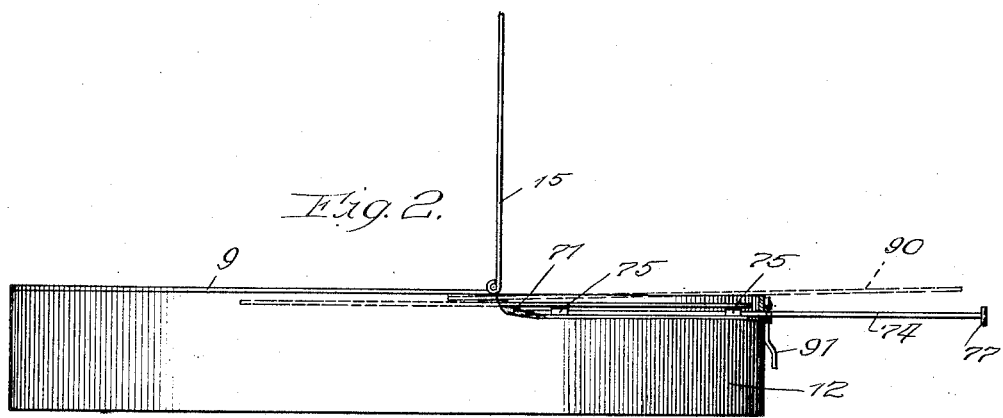
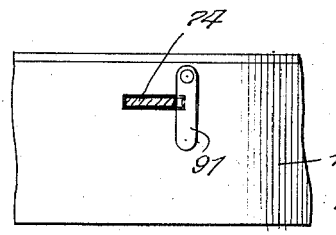

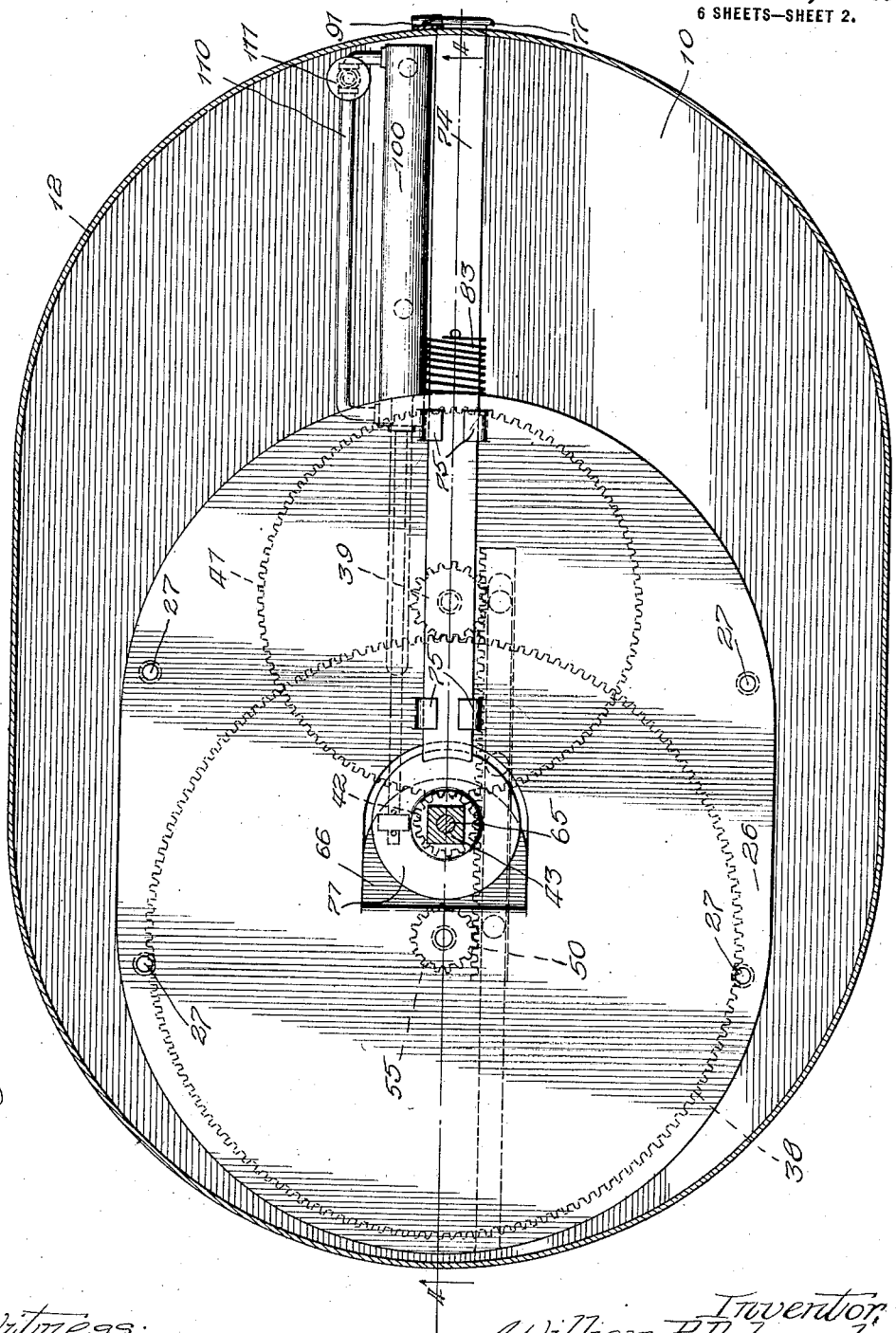

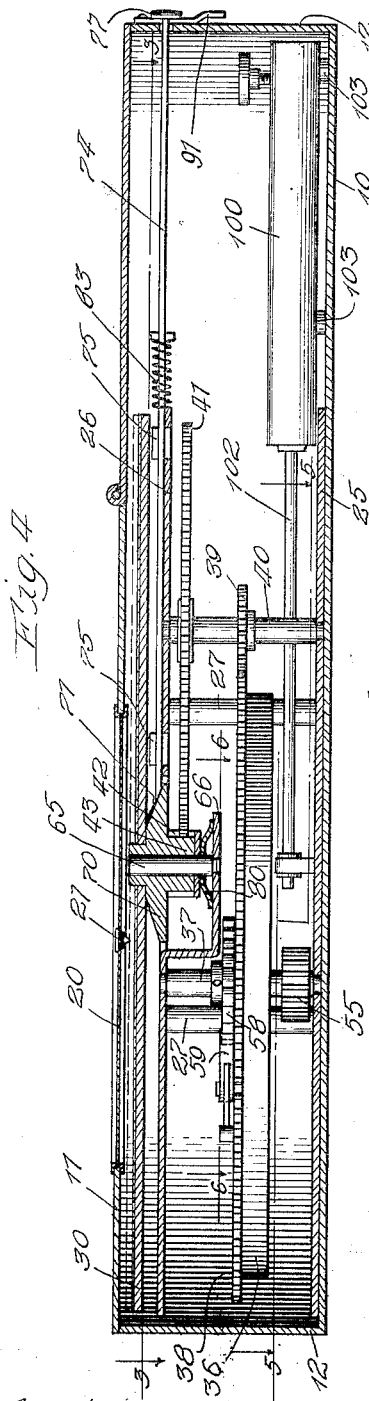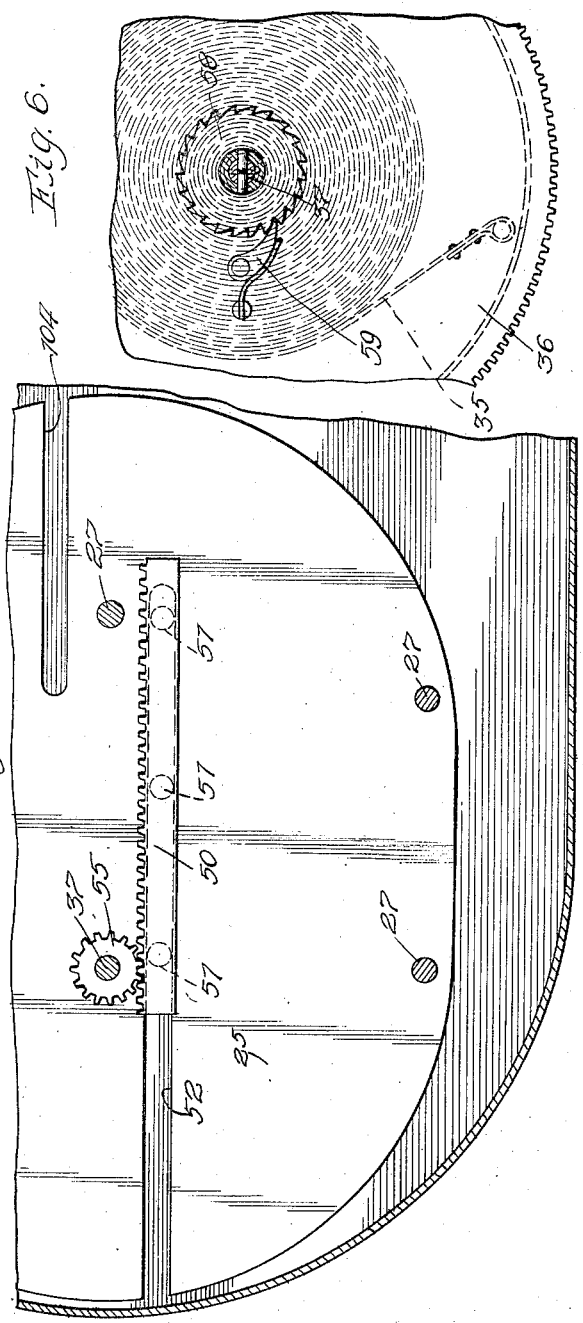

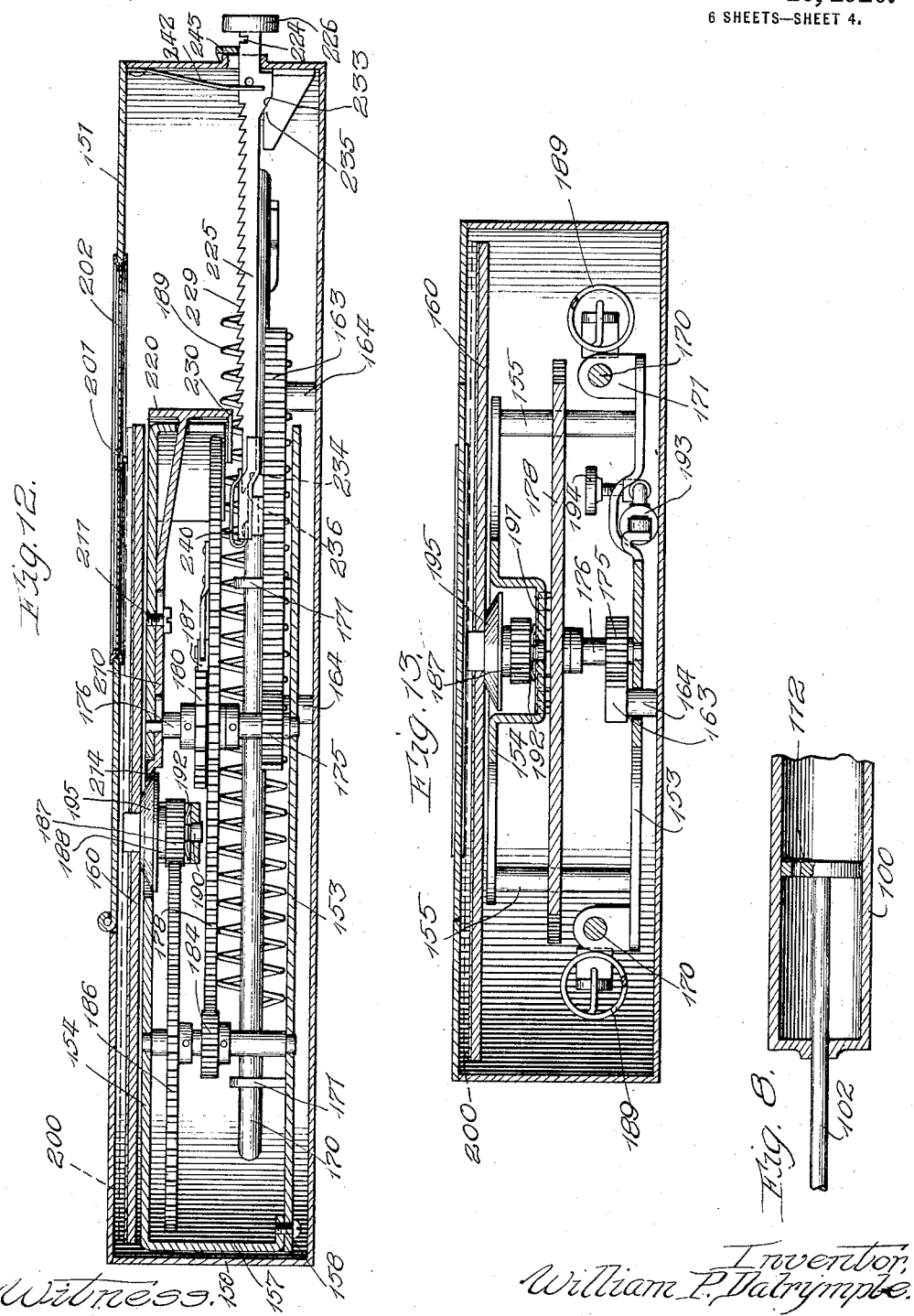

W. P. DALRYMPLE.
PHONOGRAPH.
APPLICATION FILED SEPT. 15, 1917.
1,358,709.
Patented Nov. 16, 1920.
6 SHEETS—SHEET 5.
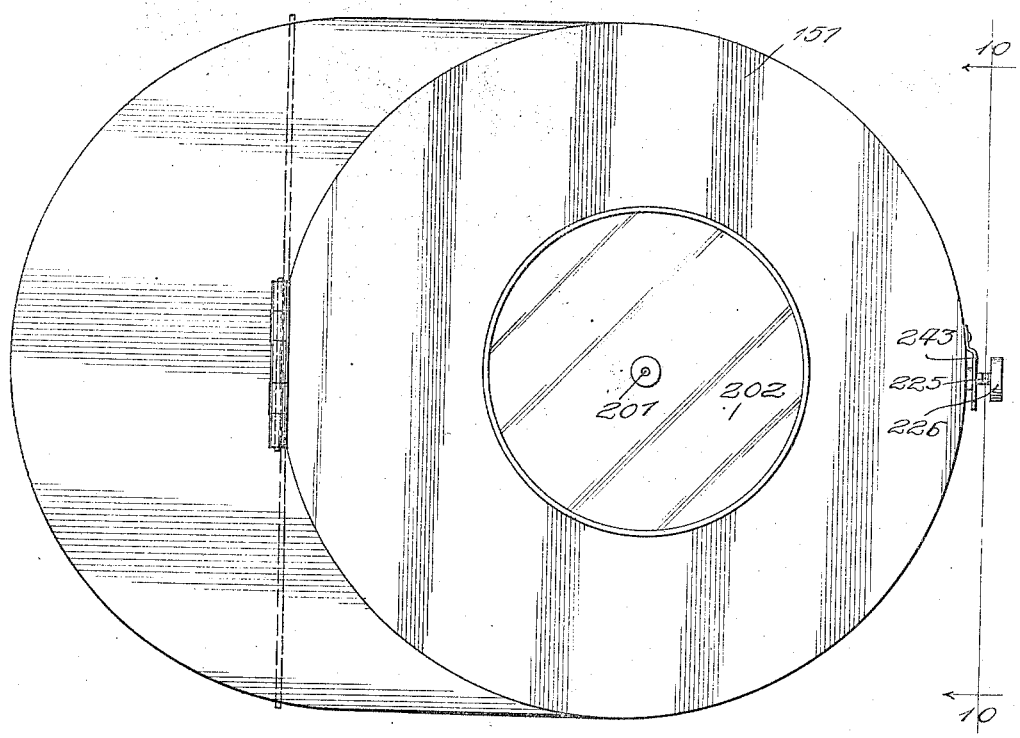
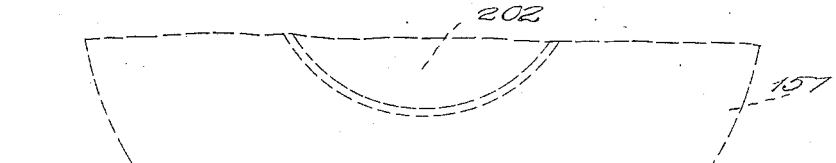
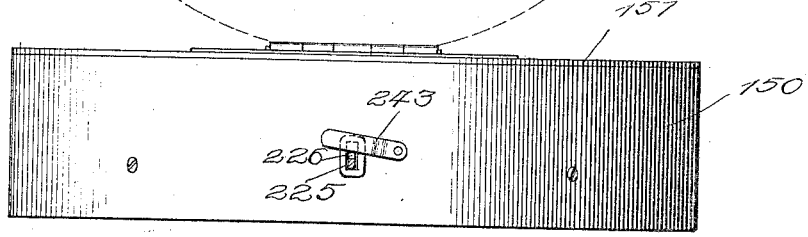

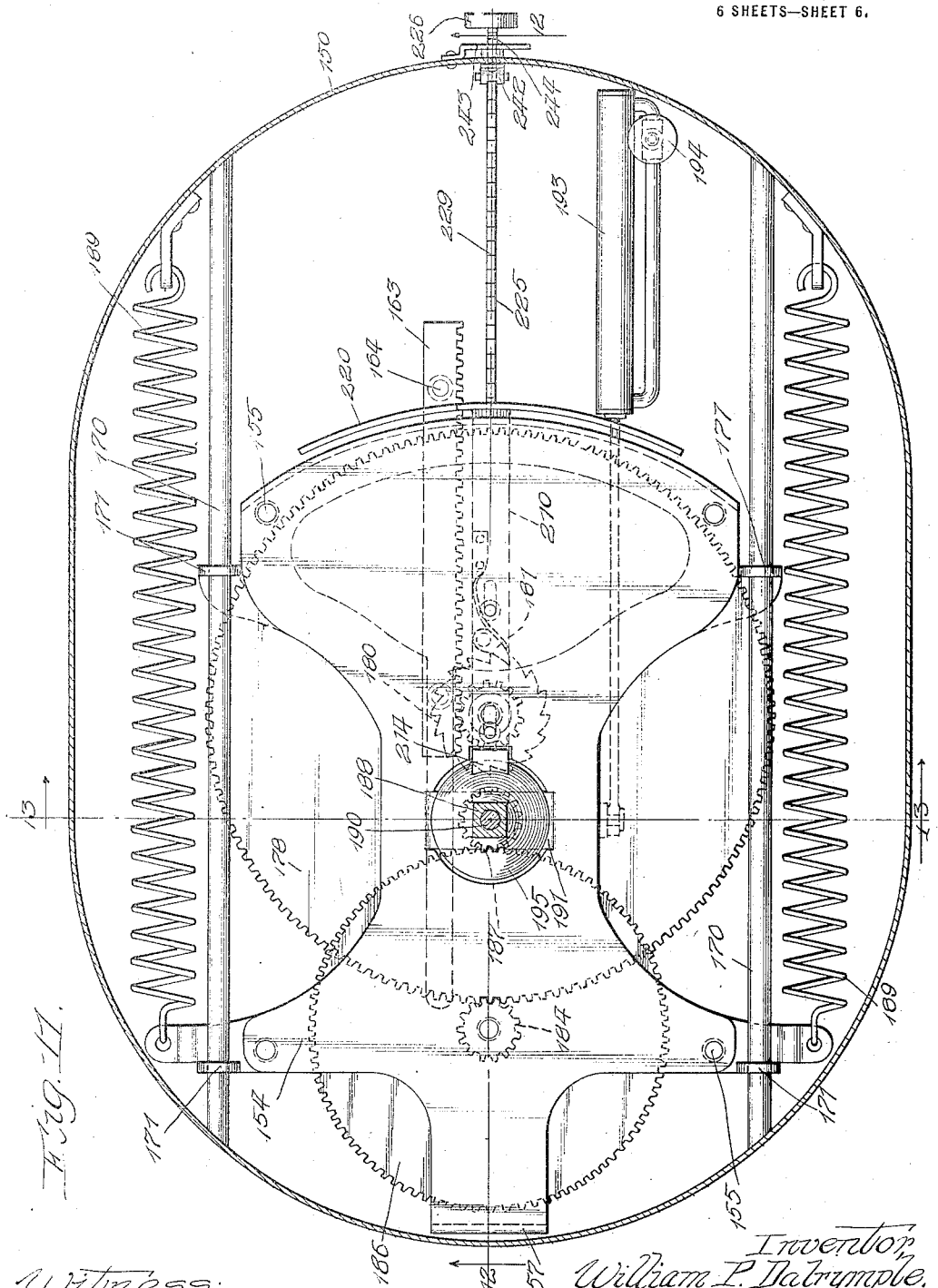

UNITED STATES PATENT OFFICE.

WILLIAM P. DALRYMPLE, OF CHICAGO, ILLINOIS.

PHONOGRAPH.

1,358,709.

Specification of Letters Patent.   Patented Nov. 16, 1920.

Application filed September 15, 1917. Serial No. 191,610.

*To all whom it may concern:*

Be it known that I, WILLIAM P. DALRYMPLE, a citizen of the United States, residing in the city of Chicago, in the county of Cook and State of Illinois, have invented new and useful Improvements in Phonographs, of which the following is a specification.

This invention relates to improvements in phonographs, and among the objects of the invention are to provide a light, portable, simple and efficient mechanism which may be made in compact form so as to occupy a small space; it being contemplated that the device may be made small enough in size to be carried in the pocket.

In general terms the device comprises a housing or case, preferably oval in form, with all of the operative mechanism arranged within it, and the running parts mounted in a frame adapted to slide endwise within the housing or case; whereby the rotative disk which carries the sound record travels in a straight line from one end of the casing to the other to carry a fixed stylus in a spiral line over the surface of the sound record.

A device embodying the principles of the invention is illustrated in the accompanying drawings in which:

Figure 1 is a top plan view showing the complete instrument.

Fig. 2 is a view of the instrument in side elevation with a small portion of the side wall of the casing broken away to disclose the parts within.

Fig. 3 is a horizontal section on the line 3—3 of Fig. 4 looking downward.

Fig. 4 is a vertical longitudinal section on the line 4—4 of Fig. 3.

Fig. 5 is a horizontal section on the irregular line 5—5 of Fig. 4 looking downward.

Fig. 6 is a horizontal section on the line 6—6 of Fig. 4 looking downward.

Fig. 7 is a fragmentary view in end elevation showing a portion of the casing with the winding stem or bar extending through it.

Fig. 8 is a fragmentary view in axial section through the cylinder of a dash pot comprising a part of the device.

Fig. 9 is a top plan view showing a modified form of the device.

Fig. 10 is a vertical section on the line 10—10 of Fig. 9.

Fig. 11 is a view showing the modified form of the device in a horizontal section taken immediately below the cover of the housing.

Fig. 12 is a longitudinal vertical section on the line 12—12 of Fig. 11.

Fig. 13 is a transverse vertical section taken on the line 13—13 of Fig. 11.

As shown in said drawings, in Figs. 1 to 8 inclusive, the complete instrument comprises a casing or housing which is approximately oval or elliptical in horizontal outline and made with flat, parallel, bottom and top walls, 10, 11, respectively, and a curved, vertical, continuous side wall, 12. This casing is provided at one end with a semi-circular opening through its top wall of the full width of the casing, the opening being ordinarily covered by a hinged lid, 15; and near the opposite end of the casing there is made a large circular opening through the top wall 11 into which is fitted a membrane or diaphragm, 20, having at its center a stylus, 21, projecting down into the casing.

Within the casing or housing, 9, there is arranged a sliding frame or structure comprising a flat bottom plate, 25, and an upper plate, 26, of similar form arranged above and parallel to the first plate; with fixed posts, 27, 27, connecting the two plates together in rigid relation to each other. Between the two plates are arranged a driving spring and a gear train to drive a turn table, 30, which is located above the upper plate, 26, and between it and the top wall 11 of the casing. Accordingly, there is provided a long, flat, spiral spring, indicated by the dotted lines at 35 in Fig. 6, which is similar to an ordinary clock spring, and is coiled within a stationary barrel or cylinder, 36. The outer end of the spring is fastened to the cylinder and its inner end is connected to a shaft 37 which extends through the center of the cylinder and is journaled at its ends in openings in the two plates 25 and 26. A large gear, 38, is journaled on the shaft 37 above the spring barrel, 36, and meshes with a pinion 39 on a parallel shaft, 40, similarly journaled in the two plates of the frame structure; and near the upper end of the shaft 40 there is fixed a large gear, 41, which meshes with wide teeth, 42, on a hub, 43, carrying the turn table 30, so that in the rotation of the gear 38 through the unwinding of the spring, as will be hereinafter described, the speed is multiplied and the turn table 30 rotated at a suitable speed for the proper travel of the stylus 21 over a record disk on its surface.

A small distance above the bottom wall 10 of the phonograph housing or casing there is fixed a stationary rack bar, 50, which is secured to the bottom 10 by studs or rivets, 51, 51, extending through a long, longitudinal slot, 52, in the sliding plate 25; these rivets or studs thus serving to guide the sliding frame structure in its straight line movement. Meshing with the rack bar 50 is a pinion, 55, which is fixed on the shaft 37 below the spring barrel 36. The shaft 37 also carries a fixed ratchet wheel, 58, which is engaged by a pivoted pawl, 59, on the face of the gear 38, whereby the rotation of the pinion 55 and the shaft 37 in one direction may wind the spring 35 without moving the gear 38, while the opposite rotation of the shaft 37 through the unwinding of the spring will drive the gear 38 and through it the turn table 30, as above described.

The hub 43 of the turn table 30 is journaled on a short, vertical shaft, or spindle 65, which is fixed at its lower end in a small shelf, or ledge, 66, between the two plates 25 and 26 of the sliding frame structure; the shelf 66 being formed by making an approximately semicircular cut near the center of the plate 26 and bending the separated parts downward and then horizontally, as indicated in Figs. 3 and 4. On the hub 43 immediately below the turn table 30 is a large circular flange, 70, having a conical upper surface, 71. There is also secured to the top plate 26 of the sliding frame structure a long, flat bolt or bar, 74, which is guided in clip guides, 75, formed by cutting through the plate 26 and bending the detached parts of the metal upward and over the bar 74; this bar extending out through a slot in the vertical front wall of the casing 9 where it is provided with a fixed knob or button, 77. The inner end of the bar 74 is adapted to engage upon the conical upper surface of the flange 70 whereby a pressure of the end of the bar against the surface of the flange will act to brake the rotation of the latter and also to press the hub 43 downward against a yielding spring washer 80; which is permitted by making the gear teeth 42 of such width as not to interfere with their proper meshing. A small spring, 83, which is coiled about the bar 74, also engages against the edge of the plate 26 and acts to yieldingly press the bar outward and out of engagement with the flange 70.

The operation of these parts is as follows:

It being assumed that the sliding frame structure is in its outer position or in a position at the front of the casing or housing 9 and below the door 15 the latter is opened and a record disk, 90, is inserted through the opening, as indicated in Fig. 2, and placed upon the turn table 30. The projecting bar 74 is then pushed inward to engage its inner end against the conical upper surface of the flange 70 on the hub of the turn table, which acts first to press this hub downward and separate the record disk from the stylus 21; further pressure on the bar 74 acting to slide the entire movable frame structure endwise and roll the rack gear along the rack bar 50 to wind the driving spring. With the device thus set for operation, a latch 91 may be engaged over the button or knob 77 to restrain the mechanism from operating, or, if desired, the parts may be released and the mechanism allowed to operate through the unwinding of the driving spring 35 to rotate the gear train and the turn table 30, as above described; while at the same time the unwinding operation will cause the pinion 55 to roll along the rack and impart the necessary axial movement to the turn table to cause the stylus to pursue its spiral path over the record disk.

The unwinding of the spring 35 and the operative movement of the mechanism are governed and restrained through a dash pot device comprising a cylinder, 100, which is fixed to the bottom wall 10 of the phonograph casing, with a piston within it and a piston rod, 102, attached at its outer end to the sliding plate 25; the cylinder being spaced above the bottom wall 10 by means of short posts or studs, 103, 103, which are accommodated in a slot, 104, in the plate 25 so that the latter may slide along the cylinder. A by-pass tube, 110, (Fig. 3) leads from one end of the cylinder to the other and is provided with a regulating valve, 111. The cylinder is filled with liquid and the operation of the mechanism acts to impel the liquid from one end of the cylinder into the other through a restricted opening afforded by the valve 111, thus braking the operation of the parts when the phonograph mechanism is in operation; while in the opposite movement of the piston when the spring is being wound the liquid escapes through a check valve 112 in the piston (Fig. 8) so as to permit the free movement of the parts.

It is designed that the instrument above described may be used either as a recording or reproducing instrument, applicant having discovered that the point of the stylus 21 may be made in such form as to be suited for both purposes and to operate on disks made of celluloid, tin foil, wax and other substances, whereby there is produced a simple, practical and efficient piece of mechanism which is light and compact in form and adapted for all of the ordinary uses to which such an instrument may be put.

The form of device shown in Figs. 9 to 13 inclusive is similar in its essential respects to that above described and comprises an elliptical casing or housing 150 for the mechanism with flat, parallel, top and bottom walls and a continuous, curved, vertical wall connecting them. In the top wall is made a large circular opening covered by a hinged lid 151. Within the housing there is arranged a frame work to support the moving parts of the device, this framework comprising a horizontal lower plate 153 and a parallel upper plate 154 which is joined to the lower plate by rigid connecting posts 155, 155, and by an integral vertical flange 157 depending from the upper plate and secured to the lower plate by a screw 158. The operative parts of the mechansm, including a gear train for driving a turn table 160 which is mounted above the plate 154 and under the cover of the housing, are arranged between the two plates 153 and 154 and comprise parts as follows:

In the lower part of the phonograph housing or casing there is arranged a fixed, stationary, horizontal rack bar 163 which is supported from the lower wall of the casing by short posts 164 so as to be spaced somewhat above this bottom wall and above the frame plate 153; the posts 164 extending though a long slot in the latter. The mechanism frame work is adapted to slide endwise in the phonograph housing, being guided upon two long parallel horizontal rods 170, 170, which extend through openings in ears 171, 171 bent up from the plate 153. Immediately above the plate 153 there is journaled a pinion 175 meshing with the rack 163, the pinion 175 being fixed to a shaft 176 which carries a loose gear 178. There is also fixed to the shaft 176 a rachet wheel 180 which engages with a pawl 181 on the face of the gear 178, so that in the rotation of the pinion 175 in one direction this shaft may turn loosely in the hub of the gear 178 while its opposite rotation will impart corresponding rotation to the gear 178. The latter in turn meshes with a small pinion 184 fixed to a shaft which carries a large gear 186, and this gear meshes with a widefaced pinion 187 on the hub 188 of the turn table 160.

Two long, parallelly arranged, helical driving springs 189 are connected to the sliding plate 153 and to the opposite end wall of the phonograph housing to impart an endwise pull on the sliding mechanism frame within the phonograph housing, so that by sliding this frame endwise to extend the springs and then releasing it the springs may act to impart an endwise pull on the frame work and rotate the driving pinion 175 through its engagement with the fixed rack 163; the ratchet and pawl, 180 and 181, being so arranged that in the operative movement of the mechanism under the action of the springs 189 the ratchet will drive the pawl and the large gear 178, which movement is transmitted to the turn table 160. This operation of the mechanism is properly retarded and controlled by a dash pot device 193 with a regulating valve 194 similar in all respects to the dash pot device 100 above described.

The hub 188 of the turn table 160 is journaled on a short vertical shaft or spindle 190 which is fixed in and projects upward from a small shelf or ledge 191 formed below the plate 154 by bending a portion of the latter downward and thence horizontally; and beneath the hub 188 there is placed a spring washer 192 separating it from the shelf 191 so that the hub may slide upward and downward a small distance. The hub 188 is also made with a conic upper surface 195 and the turn table 160 is adapted to carry a flat record disk 200 which is traversed by a stylus 201 in the center of a diaphragm 202. This diaphragm is fitted into a circular opening through the hinged lid 151 of the housing.

To the under side of the top plate 154 of the sliding mechanism frame there is fastened a flat horizontal bar 210 which is slotted and connected to the plate 154 by a screw 211 so as to permit it to slide inward and outward with respect to the axis of the turn table 160. The inner end of this bar is made in the form of a wedge 214 adapted to engage on the conic surface 195, so that when the bar 210 is pushed inward, through a large curved handle, or plate 220 at its outer end, it may engage upon the conic surface and brake the rotation of the latter; while at the same time exerting a down thrust against the spring 192 to press the turn table 160 downward and withdraw the record disk from the stylus 201.

In addition there is provided a long notched bar 225 which extends outward through the front end wall of the phonograph housing and terminates in a push button, 226, the bar being made of such length as to meet the end of the sliding mechanism frame when the latter is at the farthest extent of its inward travel. On the upper edge of the bar 225 are made saw-tooth notches, 229, which are adapted for engagement by the beveled lower edge, 230, of the plate 220; and on the under side of the bar 225 at each end of the latter are made cam surfaces 233 and 234 to engage upon corresponding fixed inclined surfaces on stationary parts 235 and 236, so that an inward movement of the bar 225 will act to raise the ends of the latter against the yielding action of a spring 240 acting to press it downward. The bar 225 is pressed yieldingly outward by a spring 242 and may be locked or latched in its inward position by a latch bolt 243 engaging in a notch 244.

In the operation of the device, it being assumed that the two springs 190 are unstretched and the traveling mechanism frame in the outer end of the phonograph housing, the cover 151 may be raised and a record disk laid upon the turn table 160.

The operator may then press upon the curved plate or handle 220 to push the mechanism backward in the housing, this operation extending the driving spring 190. The push button 226 may then be pushed inward to raise the notched bar 225 and engage it against the edge of the plate 220 and latch the device against unwinding, it being noted that the pressure of the wedge surface 214 against the conic ring 195 will hold the turn table downward and keep the stylus out of engagement with the record disk when the cover 151 is closed. When it is desired to operate the device it is necessary only to release the button 226, thus permitting the mechanism to travel along under the contracting force of the driving spring 190, causing the turn table to rotate and the entire mechanism to travel endwise for the proper spiral course of the stylus over the face of the record disk. If at any time it is desired to stop the mechanism this may be accomplished by pushing in the button 226, which will have the double effect of engaging against the edge of the plate 220 to press against the hub of the turn table and brake the rotation, and also withdrawing the record disk from the stylus and pushing the entire mechanism back a certain distance so as to automatically back space the stylus in its grooves. The device may then be latched by the latch bolt 243 or may be released again and allowed to continue its travel and operation as above described.

I claim as my invention:

1. In a phonograph, a turn table adapted to rotate and to slide upward and downward, a spring yieldingly supporting the turn table in its upper position, a circular flange with a conic surface on the hub of the turn table, and means engaging the conic surface to brake the rotation of the turn table and to press it downward against the spring.

2. In a phonograph, a traveling mechanism frame carrying a turn table, a record disk on the turn table, a fixed stylus adapted for engagement with the record disk, and means engaging a part connected with the turn table to brake its rotation and withdraw it from the stylus.

3. In a phonograph, the combination of a rotative turn-table mounted on a vertical pivot and adapted to move upward and downward, a record disk on the turntable, a fixed stylus over the surface of the record disk, and means engaging a part connected with the turn-table to move it downward away from the stylus.

4. In a phonograph, a turn-table, a record disk on the turn-table, a stylus adapted for engagement with the record disk, and means for braking the rotation of the turn-table and moving it and the record disk away from the stylus.

5. In a phonograph, the combination of a rotative turn table mounted on a vertical pivot and adapted to move upward and downward, a record disk on the turn table, a fixed stylus over the surface of the record disk, and means engaging a part connected with the turn table to move it downward.

In witness whereof I have hereunto subscribed my name this 28th day of July, 1917.

WILLIAM P. DALRYMPLE.